(12) United States Patent
McElroy et al.

(10) Patent No.: US 10,780,760 B2
(45) Date of Patent: Sep. 22, 2020

(54) SYSTEM AND METHOD FOR RELIEVING CABIN PRESSURE IN A MOTOR VEHICLE

(71) Applicant: FORD GLOBAL TECHNOLOGIES, LLC, Dearborn, MI (US)

(72) Inventors: Michael Murphy McElroy, South Lyon, MI (US); Jeffrey Michael Attala, Lasalle (CA); Mukdam Kena, Sterling Heights, MI (US); Allison Jean Hull, Northville, MI (US); Ryan Kurrle, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 15/909,676

(22) Filed: Mar. 1, 2018

(65) Prior Publication Data
US 2019/0270361 A1    Sep. 5, 2019

(51) Int. Cl.
| B60H 1/00 | (2006.01) |
| B60H 1/24 | (2006.01) |
| F16K 17/36 | (2006.01) |

(52) U.S. Cl.
CPC ..... *B60H 1/00828* (2013.01); *B60H 1/00485* (2013.01); *B60H 1/00742* (2013.01); *B60H 1/00764* (2013.01); *B60H 1/248* (2013.01); *F16K 17/36* (2013.01)

(58) Field of Classification Search
CPC .................................................. B60H 1/00828
USPC .......................................................... 454/70
See application file for complete search history.

(56) References Cited

U.S. PATENT DOCUMENTS

| 4,593,609 | A | * | 6/1986 | Nagatomo | B60H 1/00471 |
| | | | | | 454/156 |
| 5,570,838 | A | | 11/1996 | Davis, Jr. et al. | |
| 6,118,099 | A | | 9/2000 | Lake et al. | |
| 10,377,208 | B2 | * | 8/2019 | Hasan | B60H 1/00764 |
| 2007/0123159 | A1 | | 5/2007 | Venkatappa et al. | |
| 2008/0115517 | A1 | * | 5/2008 | Tacey | B60H 1/248 |
| | | | | | 62/244 |
| 2008/0134715 | A1 | | 6/2008 | Lewis et al. | |
| 2010/0011789 | A1 | | 1/2010 | Carlson et al. | |
| 2010/0052364 | A1 | | 3/2010 | Cavanaugh | |
| 2012/0000210 | A1 | * | 1/2012 | Kim | B60H 1/00778 |
| | | | | | 62/61 |
| 2012/0009859 | A1 | | 1/2012 | Wijaya et al. | |
| 2012/0247747 | A1 | | 10/2012 | DiGasbarro et al. | |
| 2013/0095738 | A1 | * | 4/2013 | Marleau | F24F 13/24 |
| | | | | | 454/141 |
| 2013/0137355 | A1 | | 5/2013 | Patti et al. | |

(Continued)

FOREIGN PATENT DOCUMENTS

DE    102007051283 A1 *    4/2009    ......... B60H 1/00849

OTHER PUBLICATIONS

"Machine Translation of DE102007051283". 2019.*

*Primary Examiner* — Edelmira Bosques
*Assistant Examiner* — Christopher Matthew Odell
(74) *Attorney, Agent, or Firm* — David Coppiellie; King & Schickli, PLLC

(57) ABSTRACT

A cabin pressure relief system for a motor vehicle includes a pressure relief valve and a control module. The control module is configured to open the pressure relief valve when an access door of the motor vehicle is opened and close the pressure relief valve in response to a specific event.

14 Claims, 3 Drawing Sheets

(56) References Cited

U.S. PATENT DOCUMENTS

| | | | |
|---|---|---|---|
| 2014/0004782 A1* | 1/2014 | Maranville | B60H 1/26 |
| | | | 454/75 |
| 2014/0335774 A1 | 11/2014 | Dorland et al. | |
| 2014/0378042 A1* | 12/2014 | Koberstein | B60H 1/249 |
| | | | 454/70 |
| 2017/0203649 A1* | 7/2017 | Jakobs | B62D 35/005 |
| 2018/0170398 A1* | 6/2018 | Miller | B60H 1/00828 |

* cited by examiner

SYSTEM AND METHOD FOR RELIEVING CABIN PRESSURE IN A MOTOR VEHICLE

TECHNICAL FIELD

This document relates generally to the motor vehicle equipment field and, more particularly, to a cabin pressure relief system as well as to a related method of releasing cabin pressure in a motor vehicle.

BACKGROUND

Motor vehicles commonly exhibit high door closing efforts and excessive window fogging due to poor relief of cabin pressure. In order to address this issue, motor vehicle manufacturers have tried to utilize the fresh air door of the climate control system of the motor vehicle for a cabin pressure relief function. Existing strategies are based on timed counts such as a five minute period initiated when the motor vehicle ignition is switched off.

Timed count systems have a number of drawbacks. For example, a motor vehicle operator may sit in the motor vehicle and continue with a phone call after the timed count timer times out. The operator will then hear the actuator drive the fresh air door closed. Many operators are annoyed by the sound. Further, the operator will not receive the benefit of cabin pressure relief once the fresh air door has been closed and excessive effort will be required to close the access door when the operator subsequently exits the motor vehicle.

This document relates to a new and improved cabin pressure relief system and related method that eliminates the disadvantages inherent in a timed count system of the type known in the prior art.

SUMMARY OF THE INVENTION

In accordance with the purposes and benefits described herein, a new and improved cabin pressure relief system is provided for a motor vehicle. That cabin pressure relief system comprises a pressure relief valve, which may take the form of a fresh air door of a climate control system in the motor vehicle, and a control module. The control module is configured to open the pressure relief valve when an access door of the motor vehicle is opened and close the pressure relief valve in response to a specific event selected from a group of events consisting of (a) an individual exiting the motor vehicle, (b) an individual entering the motor vehicle and activating an ignition of the motor vehicle or (c) an individual entering the motor vehicle and activating a climate control system of the motor vehicle.

The control module may further include a controller and a controller-controlled actuator connected to the pressure relief valve. The controller-controlled actuator displaces the pressure relief valve between an open position and a closed position.

The cabin pressure relief system may further include a seat occupancy monitoring device to provide seat occupancy data to the controller. The cabin pressure relief system may further include a door status monitoring device to provide door open/closed status data to the controller. The cabin pressure relief system may further include a wheel speed monitoring device to provide wheel speed data to the controller.

The cabin pressure relief system may further include an ignition on/off monitoring device to provide ignition on/off status data to the controller. The cabin pressure relief system may further include a seat belt status monitoring device to provide seat belt status data to the controller. Still further, the cabin pressure relief system may include a battery charge status monitoring device to provide battery charge status data to the controller.

In accordance with an additional aspect, a method is provided for releasing cabin pressure and, more particularly, relieving spikes in cabin pressure produced when closing an access door of a motor vehicle. That method may be broadly described as comprising the steps of monitoring, by a door status monitoring device, open/closed status of an access door of the motor vehicle and opening, by a control module, a pressure relief valve when the access door of the motor vehicle is opened in order to release cabin pressure when the access door is subsequently closed.

The method may further include the steps of monitoring, by a seat occupancy monitoring device, seat occupancy status of a seat of the motor vehicle and closing, by the control module, the pressure relief valve after an individual vacates the seat and exits the motor vehicle.

The method may further include the steps of monitoring, by a seat occupancy monitoring device, seat occupancy status of a seat of the motor vehicle and closing, by the control module, the pressure relief valve after an individual occupies the seat and a climate control system of the motor vehicle is activated.

Still further, the method may include the steps of monitoring, by a seat occupancy monitoring device, seat occupancy status of a seat of the motor vehicle and closing, by the control module, the pressure relief valve after an individual occupies the seat and an engine of the motor vehicle is activated.

The method may further include the steps of monitoring, by an ignition on/off monitoring device, the ignition status of the motor vehicle and providing ignition status data to the control module. The method may further include the steps of monitoring, by a wheel speed monitoring device, the speed of a wheel of the motor vehicle and prompting the control module to activate a cabin pressure relief system of the motor vehicle.

Still further, the method may include the steps of monitoring, by a seat belt monitoring device, the seat belt status of the seat belts of the motor vehicle and providing seat belt status data to the control module. In addition, the method may include the step of operating a fresh air inlet door of the motor vehicle as the pressure relief valve.

In the following description, there are shown and described several preferred embodiments of the cabin pressure relief system and the related method for releasing or relieving cabin pressure in a motor vehicle. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cabin pressure relief system and related method and together with the description serve to explain certain principles thereof.

Reference will now be made in detail to the present preferred embodiments of the cabin pressure relief system and related method, examples of which are illustrated in the accompanying drawing figures.

DETAILED DESCRIPTION

Figure 1:
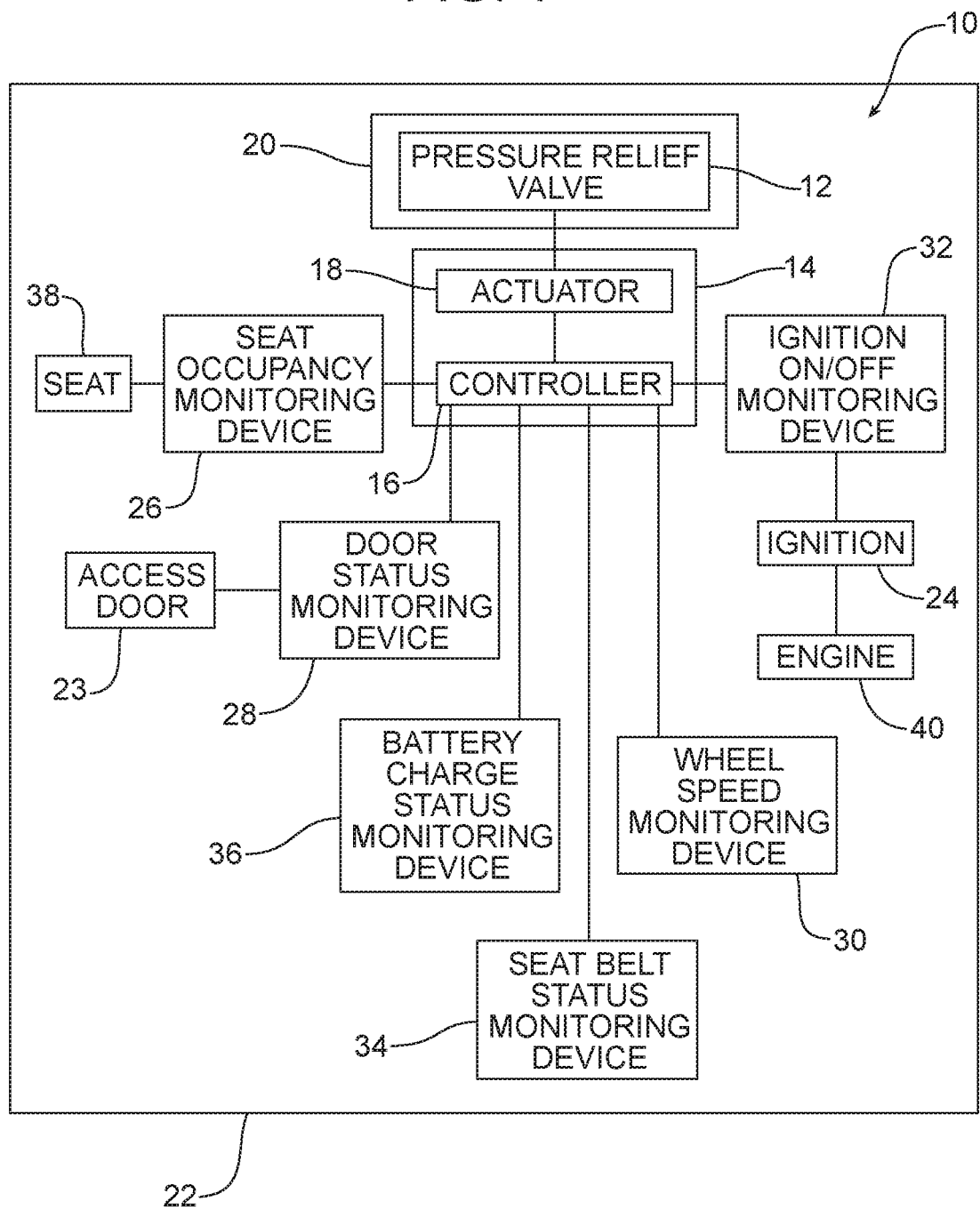
FIG. 1 is a schematic block diagram of the cabin pressure relief system for a motor vehicle.

Reference is now made to FIG. 1 schematically illustrating the cabin pressure relief system 10. The cabin pressure relief system 10 includes a pressure relief valve 12 and a cooperating control module 14. In the illustrated embodiment, the control module 14 includes a controller 16 and a controller-controlled actuator 18. The controller-controlled actuator 18 is connected to the pressure relief valve 12 and functions to displace the pressure relief valve 12 between an open position and a closed position. In one of the many possible embodiments of the cabin pressure relief system 10, the pressure relief valve comprises the fresh air door of the climate control system 20 of the motor vehicle 22.

The controller 16 may comprise a computing device such as a dedicated micro processor or an electronic control unit (ECU) operating in accordance with instructions from appropriate control software. Thus, the controller 16 may include one or more processors, one or more memories and one or more network interfaces all in communication with each other over a communication bus. In one or more of the many possible embodiments of the cabin pressure relief system 10, the controller may comprise a body control module or BCM of the motor vehicle.

As will become apparent from the following description, the control module 14 is configured to open the pressure relief valve 12 when one or more access doors 23 of the motor vehicle 22 is opened and close the pressure relief valve 12 in response to a specific event. That specific event may be selected from a group of events consisting of: (a) an individual exiting the motor vehicle 22, (b) an individual entering the motor vehicle and activating an ignition 24 of the motor vehicle 22 or (c) an individual entering the motor vehicle and activating a climate control system 20 of the motor vehicle.

The cabin pressure relief system 10 may further include a series of monitoring devices for monitoring certain operating systems and features of the motor vehicle 22 of relevance to the efficient and effective operation of the cabin pressure relief system 10. Thus, as illustrated in FIG. 1, the cabin pressure relief system 10 may further include a seat occupancy monitoring device or seat occupancy monitor 26 to provide seat occupancy data to the controller 16. The cabin pressure relief system 10 may further include a door status monitoring device or door status monitor 28 to provide door open/close status data to the controller 16.

The cabin pressure relief system 10 may further include a wheel speed monitoring device 30 or wheel speed monitor to provide wheel speed data to the controller 16. In addition, the cabin pressure relief system 10 may further include an ignition on/off monitoring device or ignition on/off monitor 32 to provide ignition on/off status data to the controller 16.

The cabin pressure relief system 10 may further include a seat belt status monitoring device 34 to provide seat belt status data to the controller 16. Further, the cabin pressure relief system 10 may further include a battery charge status monitoring device 36 to provide battery charge status data to the controller 16. The cabin pressure relief system 10 may be configured to operate for only so long as the battery of the motor vehicle maintains a charge level above a predetermined charge level. This is done to conserve battery power for engine start.

As will be apparent from the following examples, seat occupancy data from the seat occupancy monitoring device 26, door open/close status data from the door status monitoring device 28, wheel speed data from the wheel speed monitoring device 30, ignition on/off status from the ignition on/off monitoring device 32, seat belt status from the seat belt monitoring device 34 and battery charge status from the battery charge status monitoring device 36 may be utilized in substantially any combination to provide intelligent control for the cabin pressure relief system 10.

Consistent with the above description, a method of releasing or relieving cabin pressure in a motor vehicle 22 may comprise the steps of (a) monitoring, by the door status monitoring device 28, the open/close status of one or more access doors 23 in the motor vehicle 22 and (b) opening, by the control module 14, the pressure relief valve 12 when the access door of the motor vehicle is opened in order to release cabin pressure when the access door is subsequently closed. Advantageously, this release of cabin pressure reduces the effort required to close the access door 23 for the benefit of the operator.

In one or more embodiments of the cabin pressure relief system 10, the method may further include the step of monitoring, by the seat occupancy monitoring device 26, seat occupancy status of a seat 38 of the motor vehicle and closing, by the control module 14, the pressure relief valve 12 after an individual vacates the seat and exits the motor vehicle.

In one or more of the many possible embodiments of the cabin pressure relief system 10, the method may include the steps of (a) monitoring, by the seat occupancy monitoring device 26, seat occupancy status of at least one seat 38 of the motor vehicle and (b) closing, by the control module 14, the pressure relief valve 12 after an individual occupies the seat and the climate control system 20 of the motor vehicle is activated.

In one or more embodiments of the cabin pressure relief system 10, the method may include the steps of (a) monitoring, by the seat occupancy monitoring device 26, seat occupancy status of a seat 38 of the motor vehicle and (b) closing, by the control module 14, the pressure relief valve 12 after an individual occupies the seat and an engine 40 of the motor vehicle 22 is activated through the ignition 24.

In these and other embodiments, the method of releasing cabin pressure in a motor vehicle 22 may include the steps of (a) monitoring, by the ignition on/off monitoring device 32, ignition status of the motor vehicle and (b) providing ignition status data to the control module 14. Further, the method may include the steps of (a) monitoring, by a wheel speed monitoring device 30, speed of at least one wheel of the motor vehicle 22 and (b) prompting the control module 14 to activate the cabin pressure relief system 10. In still other possible embodiments, the method may include the steps of (a) monitoring, by a seat belt status monitoring device 34, seat belt status of seat belts of the motor vehicle 22 and (b) providing seat belt status data to the control module 14. Still further, the method may include the step of operating a fresh air inlet door of the motor vehicle as the pressure relief valve 12.

Figure 2:
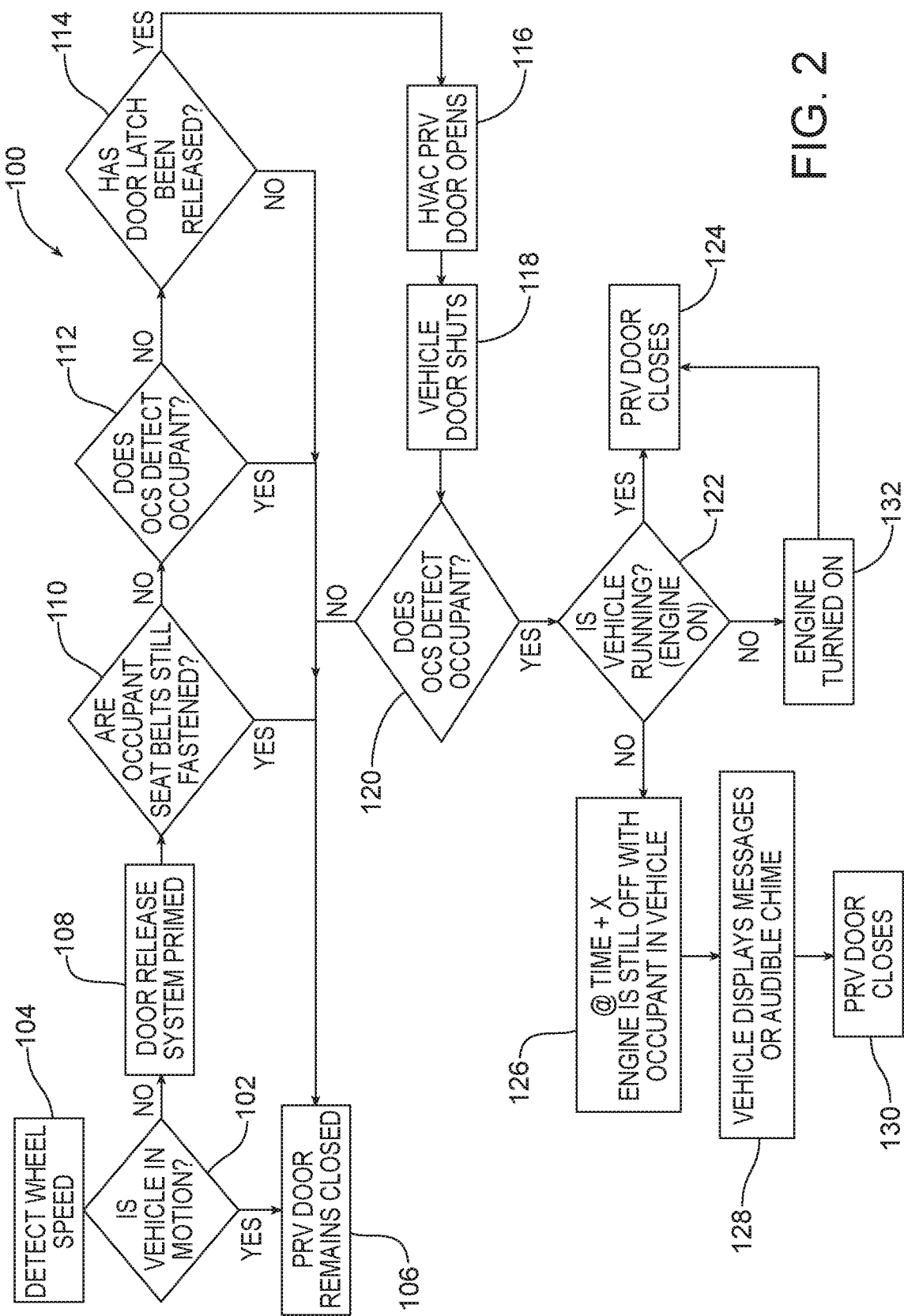
FIG. 2 is a control logic flow diagram for a first possible embodiment of the cabin pressure relief system.

Reference is now made to FIG. 2 illustrating a first embodiment of the control logic flow diagram 100 for the cabin pressure relief system 10. That control logic flow diagram 100 is initiated at box 102 when the controller 16 of the control module 14 queries whether the motor vehicle 22 is in motion. Toward this end, the wheel speed monitoring device 30 detects the wheel speed at box 104 and provides wheel speed data to the controller 16. If the motor vehicle 22 is in motion, the pressure relief valve 12 is maintained in the closed position or whatever position setting is required at that time by the climate control system 20 (see box 106). In contrast, if the vehicle is not in motion, the cabin pressure relief system 10 is primed or prompted at box 108.

Next, the controller 16 of the control module 14 queries at box 110 if the occupant seat belts are still fastened. Toward this end, the seat belt status monitoring device 34 detects the seat belt status at each seat 38 and provides seat belt status data to the controller 16. If seat belts are still fastened, the pressure relief valve 12 is maintained in a closed position or in accordance with the operating position dictated by the climate control system 20 at box 106. If seat belts are not still fastened, the controller 16 of the control module 14 queries whether the seats 38 are still occupied at box 112. This determination by the controller 16 is made based upon seat occupancy data received from the seat occupancy monitoring device 26. If one or more of the seats 38 are still occupied, the pressure relief valve 12 remains closed or in the desired climate control system setting at box 106. If not occupied, the controller 16 of the control module 14 queries whether the door latch has been released at box 114.

The door status monitoring device 28 provides the necessary door open/close status data to the controller 16 to make that determination. If the door latch has not been released indicating that the door 23 has remained closed, the pressure relief valve 12 is maintained in the closed position or in the position set by the climate control system 20 at box 106. In contrast, if the door has been opened, the controller 16 of the control module 14 activates the actuator 18 to open the pressure relief valve 12 at box 116.

Once the motor vehicle access doors 23 are subsequently shut at box 118, as indicated by data from the door status monitoring device 28, the controller 16 queries at box 120 if there are any occupants in the motor vehicle seats 38. This determination is made by the controller 16 based upon data provided by the seat occupancy monitoring device 26. If there are no occupants, the controller 16 activates the actuator 18 to close the pressure relief valve 12 at box 106. In contrast, if there are occupants, the controller queries whether the motor vehicle ignition 24 is on or the engine 40 is running. That determination is made by the controller 16 based upon ignition on/off data provided by the ignition on/off monitoring device 32 at box 122. If the ignition is on or the engine is running, the controller 16 controls the actuator 18 to close the pressure relief valve 12 at box 124. In the event the engine is not running, the controller 16 activates an integrated timer for a set amount of time at box 126. The controller 16 then displays a message or audible chime at 128 when the timer times out to advise the occupant of the motor vehicle that the pressure relief valve 12 is going to be closed at box 130. In the event the engine 40 is turned on while the timer is timing out (see box 132), as confirmed by data from the ignition on/off monitoring device 32, the control module 14 closes the pressure relief valve 12 at box 124.

Figure 3:
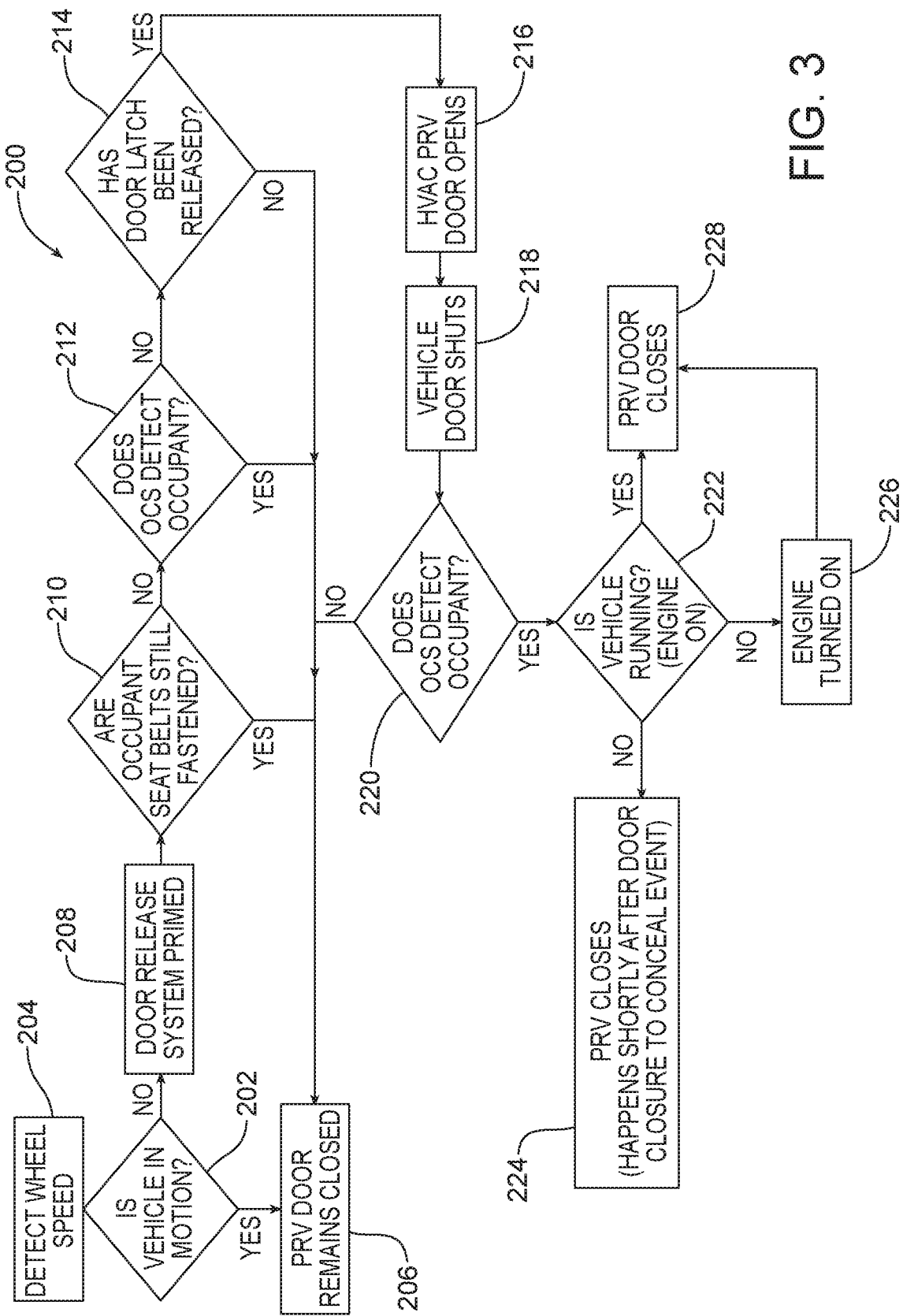
FIG. 3 is an alternative embodiment of the control logic flow diagram for the cabin pressure relief system.

Reference is now made to FIG. 3 illustrating a second possible embodiment of control logic flow diagram 200 for the cabin pressure relief system 10. That control logic flow diagram 200 begins at box 202 where the controller 16 of the control module 14 queries whether the motor vehicle 22 is in motion. The controller 16 makes this determination based on wheel speed data provided to the controller by the wheel speed monitoring device 30 at box 204. If the motor vehicle 22 is in motion, the pressure relief valve 12 remains closed or in the set position established by the climate control system 20 at box 206. In contrast, if the motor vehicle 22 is not in motion, the cabin pressure relief system 10 is prompted or primed at box 208.

Next, the controller 16 of the control module 14 queries whether the occupant seat belts are still fastened at box 210. This determination is made by the controller 16 based upon seat belt status data provided to the controller by the seat belt status monitoring device 34. If the seat belts are still fastened, the pressure relief valve 12 remains closed or in the position set by the climate control system 20 at box 206. In contrast, if the occupant seat belts are not still fastened, the controller 16 queries whether the occupants are still in the motor vehicle at box 212. The controller 16 makes this determination based upon data provided by the seat occupancy monitoring device 26.

If the seats 38 are still occupied, the pressure relief valve 12 is maintained closed or in the position set by the climate control system 20 at box 206. In contrast, if the seats 38 are not occupied, the controller 16 queries whether or not the door latch has been released at box 214. That determination is made based upon data provided to the controller 16 by the door status monitoring device 28. If the door latch has not been released or an access door 23 has not been opened, the pressure relief valve 12 is maintained in a closed position or the position set by the climate control system 20 at box 206. In contrast, if the door latch has been released or the access door 23 has been opened, the controller 16 sends a control signal to the actuator 18 which opens the pressure relief valve 12 at box 216. The closing of the access door 23 is monitored by the door status monitoring device 28 and data indicating the closing is provided to the controller 16 at box 218. Since the pressure relief valve 12 is open during the closing of the door at box 218, cabin pressure is relieved and the door closing effort is reduced.

At this point the controller 16 of the control module 14 queries whether or not an occupant is in the motor vehicle at box 220. The controller 16 makes this determination based upon occupancy data provided by the seat occupancy monitoring device 26. If no occupant is present within the motor vehicle 22, the pressure relief valve 12 is closed or returned to the position set by the climate control system 20 at box 206. In contrast, if an occupant is detected, the controller 16 queries whether or not the vehicle is running (is the engine on) at box 222.

This determination is made by the controller 16 based upon ignition on/off data provided by the ignition on/off monitoring device 32. If the vehicle is not running, the controller 16 provides a control signal to the actuator 18 to close the pressure relief valve 12 at box 224. The closing of the pressure relief valve 12 is done shortly after door closure to conceal the event/mask the sound of the closing of the valve. In the event the engine is then turned on as indicated at box 226, the pressure relief valve 12 is subsequently closed at box 228 by the control module 14.

In contrast if the vehicle is running at query box 222 following the detection of an occupant at query box 220, the control module 14 directly closes the pressure relief valve 12 at box 228.

The foregoing has been presented for purposes of illustration and description. It is not intended to be exhaustive or to limit the embodiments to the precise form disclosed. Obvious modifications and variations are possible in light of the above teachings. For example, the control logic flow diagrams 100, 200 set forth in FIGS. 2 and 3 are merely two possible examples of a nearly infinite number of control logic flow diagrams that may be utilized to control the operation of the cabin pressure relief system 10. All such modifications and variations are within the scope of the appended claims when interpreted in accordance with the breadth to which they are fairly, legally and equitably entitled.

What is claimed:

1. A cabin pressure relief system for a motor vehicle, comprising:
    a pressure relief valve; and
    a control module configured to open said pressure relief valve when an access door of said motor vehicle is opened and close said pressure relief valve in response to an individual entering said motor vehicle and activating an ignition of said motor vehicle.

2. The cabin pressure relief system of claim 1, wherein said control module includes a controller and a controller controlled actuator connected to said pressure relief valve wherein said controller controlled actuator displaces said pressure relief valve between an open position and a closed position.

3. The cabin pressure relief system of claim 2, further including a seat occupancy monitor to provide seat occupancy data to said controller.

4. The cabin pressure relief system of claim 3, further including a door status monitor to provide door open/close status data to said controller.

5. The cabin pressure relief system of claim 4, further including a wheel speed monitor to provide wheel speed data to said controller.

6. The cabin pressure relief system of claim 5, further including an ignition on/off monitor to provide ignition on/off status data to said controller.

7. The cabin pressure relief system of claim 6, further including a seat belt status monitor to provide seat belt status data to said controller.

8. The cabin pressure relief system of claim 7, further including a battery charge status monitor to provide battery charge status data to said controller.

9. The cabin pressure relief system of claim 1, wherein said pressure relief valve is a fresh air door of said climate control system of said motor vehicle.

10. A method of releasing cabin pressure in a motor vehicle, comprising:
    monitoring, by a door status monitor, open/close status of an access door of said motor vehicle;
    opening, by a control module, a pressure relief valve in response to said access door of said motor vehicle being opened in order to release cabin pressure when said access door is subsequently closed;
    monitoring, by a seat occupancy monitor, seat occupancy status of a seat of said motor vehicle; and
    closing, by said control module, said pressure relief valve in response to an individual occupying said seat and an engine of said motor vehicle being activated.

11. The method of claim 10, including monitoring, by an ignition on/off monitor, ignition status of said motor vehicle and providing ignition status data to said control module.

12. The method of claim 10, including monitoring, by a wheel speed monitor, speed of a wheel of said motor vehicle and prompting said control module to activate a cabin pressure relief system.

13. The method of claim 10, including monitoring, by a seat belt status monitor, seat belt status of seat belts of said motor vehicle and providing seat belt status data to said control module.

14. The method of claim 10, including operating a fresh air inlet door of said motor vehicle as said pressure relief valve.

* * * * *